United States Patent [19]

Huang

[11] Patent Number: 5,738,322

[45] Date of Patent: Apr. 14, 1998

[54] MOUNTING FRAME FOR ARTICLES RACK IN THE CAR

[76] Inventor: Tzu-ping Huang, 4th Floor, 12-1, Alley 15, Lane 214, Chung Hsin Road, Sec. 4, Sanchung City, Taipei Hsien, Taiwan, 241

[21] Appl. No.: 539,867

[22] Filed: Oct. 6, 1995

[51] Int. Cl.$^6$ ........................................................ E04G 3/00
[52] U.S. Cl. ............................ 248/278.1; 248/311.2; 224/553; 224/926
[58] Field of Search .......................... 248/276, 278.1, 248/291.1, 292.12, 311.2; 224/926, 553, 557

[56] References Cited

U.S. PATENT DOCUMENTS

| | | | |
|---|---|---|---|
| 3,106,425 | 10/1963 | McClintock | 248/276.1 |
| 4,470,106 | 9/1984 | Norton | 248/278.1 |
| 4,632,248 | 12/1986 | Hsu | 206/387 |
| 4,877,164 | 10/1989 | Baucom | 224/926 |
| 5,048,733 | 9/1991 | Nagy | 224/42.42 |
| 5,060,260 | 10/1991 | O'Connell | 224/553 |
| 5,072,909 | 12/1991 | Huang | 248/311.2 |
| 5,109,411 | 4/1992 | O'Connell | 224/553 |
| 5,392,350 | 2/1995 | Swanson | 379/446 |
| 5,601,268 | 2/1997 | Dunchock | 248/311.2 |

*Primary Examiner*—Leslie A. Braun
*Assistant Examiner*—Gwendolyn W. Baxter
*Attorney, Agent, or Firm*—Jacobson, Price, Holman & Stern, PLLC

[57] ABSTRACT

A first mounting frame for articles rack in the car consists of a locking plate, a first connecting element and a mounting plate connected pivotally together, and a second mounting frame for articles rack in the car consists of a locking plate, a first connecting element, a second connecting element and a mounting plate connected pivotally together; through the locking plate, the first or second mounting frame for articles rack in the car can be optionally and firmly installed in a very small plane position in any one angle, and such articles rack as a drink rack or a mobile telephone set rack in the car or a fixing plate of such a rack can be fixed on the mounting plate; and before and after locking the rack or the fixing plate, or before and after fixing the foregoing locking plate, the fixing plate or the locking plate can be optionally swung left and right or up and down and turned clockwise and counterclockwise for a desirable adjustment of their mounting position.

5 Claims, 5 Drawing Sheets

MOUNTING FRAME FOR ARTICLES RACK IN THE CAR

BACKGROUND OF THE INVENTION

The car users in general like to install such articles in the car as drink rack, mobile telephone set, indoor aromatic agent, air cleaner, tissue paper rack, sound-recording tape box, etc. in favor of taking and using them and keeping the aroma and cleanness in the car from time to time. However, there are a number of types and models of the car in general and the sedan in particular, and their external and internal designs are streamlined instead of a simple design of vertical and plane combination, so it is very difficult to find out a position which is large and convenient enough to mount and dispose the foregoing articles in the car, and it is further difficult to choose a specific position which is convenient to take and use the foregoing articles but occupies a minimum space in the car. In view of the above, the present inventor has invented a mounting frame for articles rack in the car.

DESCRIPTION OF THE PRIOR ART

The present inventor's prior invention, i.e. U.S. Pat. No. 5,072,909, "Adjustable Cup Holder in the Car", can only be mounted on a vertical wall surface in the car by means of a fixing plate but cannot be mounted in a position which is not vertical or smaller than the fixing plate, and it is inconvenient to take and use the cup and unsuitable for the people's activities in the car. During the invention of the said adjustable cup holder, the present inventor found and considered such a problem and fixed a reverse J-shaped metal strip on the fixing plate so that the said cup holder can be hooked on the lower edge of a window in the car where is convenient to take and use the cup when no suitable position is available to mount the said cup holder. However, the stability of mounting the said cup holder in the car by hooking is very low and tends to be loose and cause swinging.

In addition, the U.S. Pat. No. 4,632,248, "Sound/Video-Recording Tape storing Devices" invented by the present inventor's wife, is a box for the said tape to be used in the car only, but it is rather voluminous and almost the same as a tissue paper box in general, so to find an enough vertical or horizontal position to mount the said storing device in the car is quite difficult, and as a result, the car owners are reluctant to use the storing device which has been on sale in the market for several years for a problem of its difficult installation.

Therefore, the present inventor, through repeated research and development, has invented a mounting frame for articles rack in the car to provide the car users with convenient installation and use of a drink rack or a sound-recording tape box or a mobile telephone set or an indoor aromatic agent or an air cleaner or a tissue paper box in the car.

SUMMARY OF THE INVENTION

The object of the present invention is to offer a small locking plate to be locked in a position with a small plane area which may be vertical or horizontal in any one angle in favor of firmly mounting a drink rack, or a mobile telephone set, or an indoor aromatic agent, or an air cleaner, or a tissue paper box, or a sound-recording tape box in the car on a mounting plate very conveniently, and after it is installed well, the angle of disposing a certain mounted article can be optionally adjusted in favor of taking or using the said article.

Another object of the present invention is to offer a mounting frame for articles rack in the car to be directly locked on the back of some one article fixing plate or disposing frame in the car or on the back of outer box of the said article, so that it can be conveniently locked and mounted in a position with a small plane area which may be vertical or horizontal in any one angle, and after it is installed well, the angle of disposing a certain mounted article can be optionally adjusted in favor of taking or using the said article.

DETAILED DESCRIPTION

Figure 1:
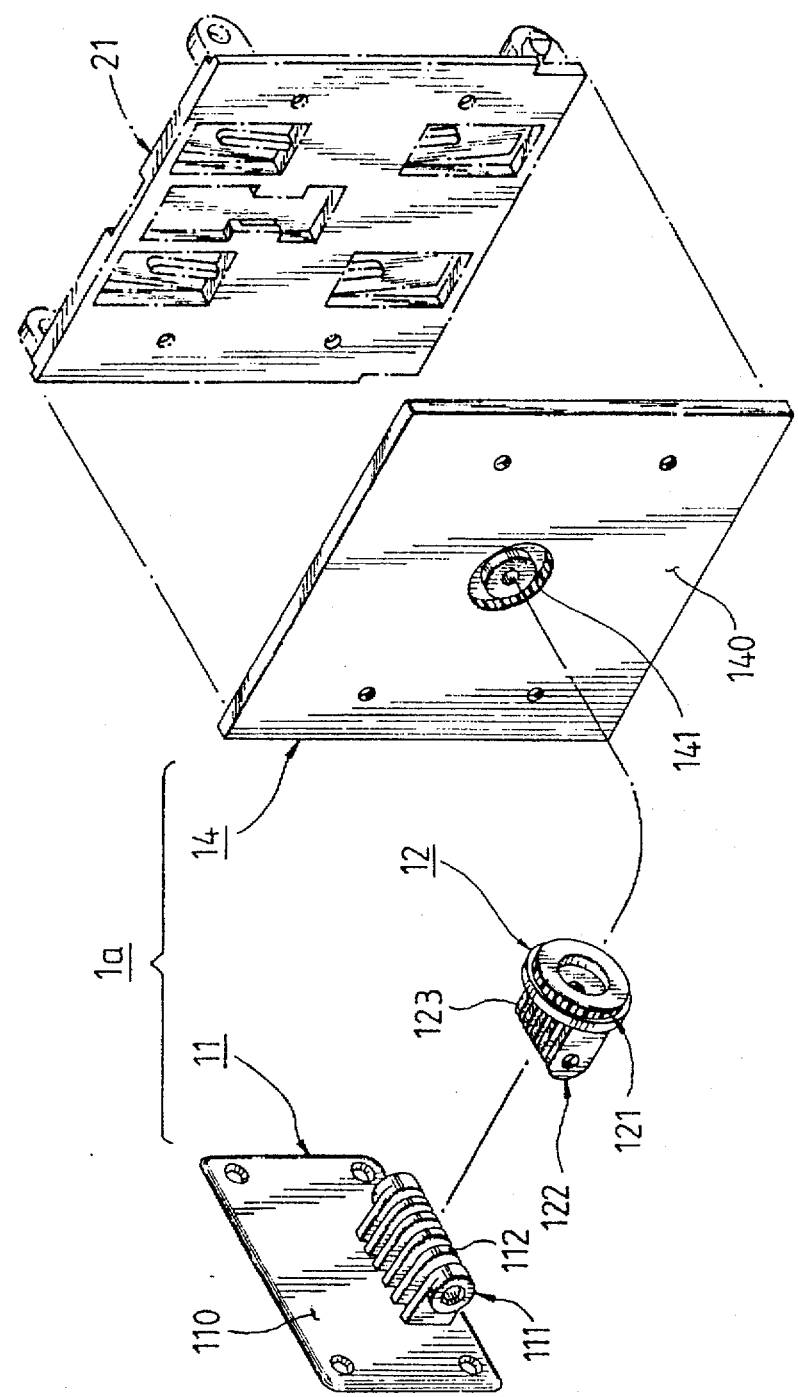
FIG. 1 is an elevational breakdown view of a fixing plate for a first mounting frame for articles rack in the car and a drink rack in the car, wherein the whole drink rack in the car is not shown for convenient disclosure.
Figure 2:
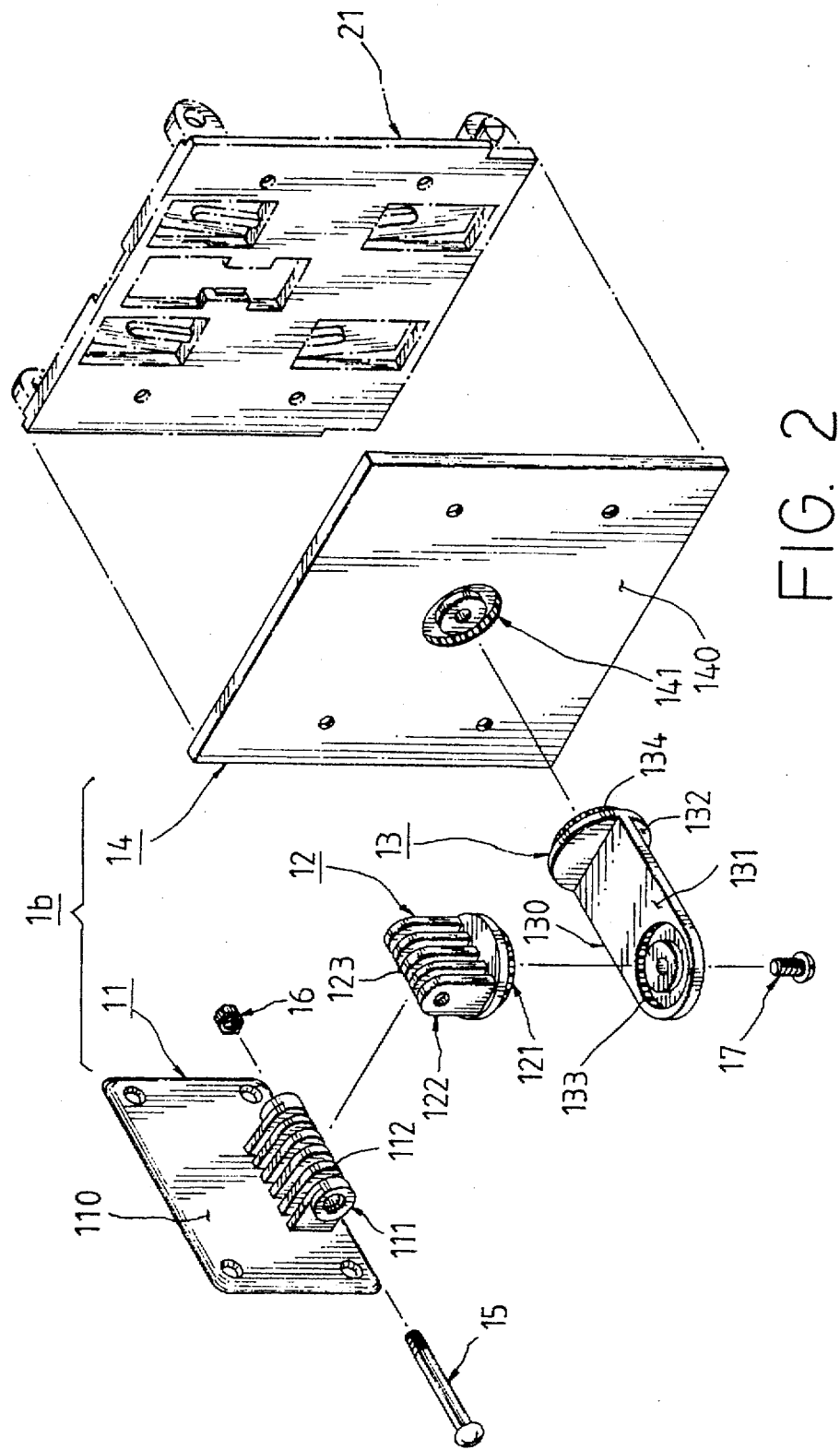
FIG. 2 is an elevational breakdown view of a fixing plate for a second mounting frame for articles rack in the car and a drink rack in the car, wherein the whole drink rack in the car is not shown for convenient disclosure.

A first mounting frame 1a for articles rack in the car, as shown in FIG. 1, consists of a locking plate 11, a first connecting element 12 and a mounting plate 14; and a second mounting frame 1b for articles rack in the car, as shown in FIG. 2, consists of a locking plate 11, a first connecting element 12, a second connecting element 13 and a mounting plate 14. The locking plate 11 of both the mounting frames 1a, 1b consists of a plate body 110 and a hinge shaft sleeve 111 on one side of the plate body 110, and the hinge shaft sleeve 111 consists of a plurality of spaced sheets 112 connected in parallel. The first connecting element 12 of both the mounting frames 1a, 1b consists of a gear 121 and a hinge shaft sleeve 122 on the back of the gear 121, and the hinge shaft sleeve 122 is disposed to be corresponding to the hinge shaft sleeve 111 on the locking plate 11 and also consists of a plurality of spaced sheets 123 connected in parallel. The locking plate 11 and the first connecting element 12 can be mutually engaged through the two hinge shaft sleeves 111, 122 and pivotally fixed with a bolt 15 and a nut 16 so as to be mutually tightened and firmly locked when tightly locking them without leading to a loose phenomenon but can be swung for adjusting the locked and fixed angle thereof when slightly turning them.

The mounting plate 14 of both the mounting frames 1a, 1b consists of a plate body 140 and an internal gear 141 at the center on the back of the plate body 140, and the dimensions and shape of the plate body 140 are in keeping with the articles to be mounted; for example, they depend on the dimensions and shape of a fixing plate 21 of a drink rack in the car. The internal gear 141 on the back of the plate body 140 engages with the gear 121 on the first connecting element 12 on the first mounting frame 1a and a screw is used to mutually lock both the gears 141, 121 together. The second connecting element 13 of the second mounting frame 1b is a lateral T-shaped plate body 130, and an internal gear 133 is provided at the end of a plane plate 131 of the said plate body 130, and a gear 134 is provided at the outer end of a vertical plate 132 of the said plate body 130.

Through the mutual engagement of the internal gear 133 at one end of the second connecting element 13 and the gear 121 on the first connecting element 12, then a screw 17 is used to pivotally mount and lock both the gears 133 and 121, and through the mutual engagement of the gear 134 on another end of the second connecting element 13 and the internal gear 141 on the mounting plate 14, then a screw (same as the screw 17) is used to lock both the gears 134 and 141; so a second connecting element 13, a first connecting element 12 and a mounting plate 14 can be pivotally installed together.

Figure 5:
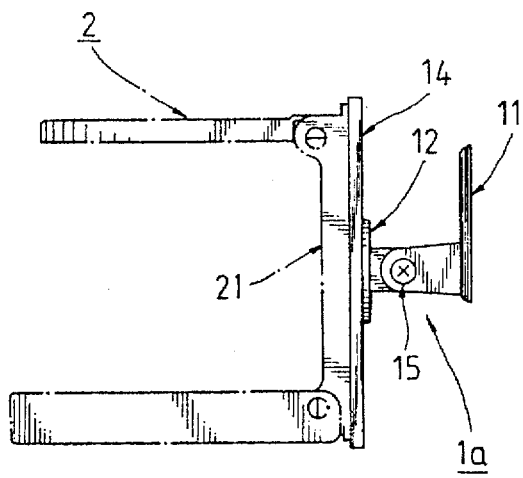
FIG. 5 is a right side view of an example of a first mounting frame for articles rack in the car in assembly with a locking device of the drink rack in the car.
Figure 6:
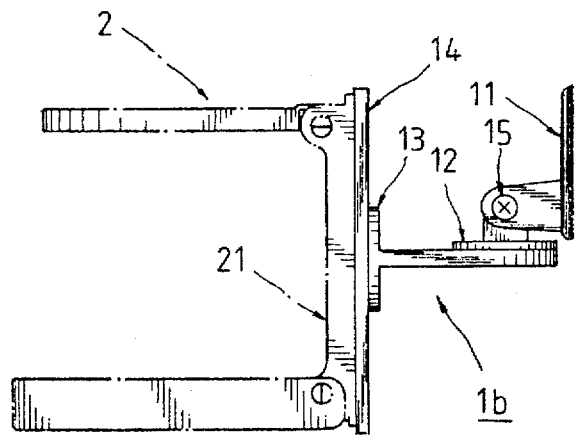
FIG. 6 is a right side view of an example of a second mounting frame for articles rack in the car in assembly with a locking device of the drink rack in the car.

Similarly, the first connecting element 12 and the locking plate 11 can be pivotally mounted together to form the second mounting frame 1b for articles rack in the car according to the present invention as shown in FIG. 6, so an article in the car such as a drink rack 2 can be fixed on the mounting plate 14 to be used in the car. If only to pivotally connect a locking plate 11 to a first connecting element 12 and then to pivotally connect a mounting plate 14 in the similar manner, a first mounting frame 1a for articles rack in the car can be formed according to the present invention as shown in FIG. 5, and an article in the car such as a drink rack 2 can be fixed on the mounting plate 14 to be used in the car.

The plate body 110 of locking plate 11 of the first mounting frame 1a for articles rack in the car can be made much smaller than the area of a fixing plate 21 of the drink rack 2 in the car as shown in FIG. 5, then a position for mounting a drink rack 2 in the car can be easily found, it is a very small area in a "vertical" state and enough for locking the plate body 110 pursuant to the "vertical" manner as shown in FIG. 5 so as to lock and mount the locking plate 11 of the first mounting frame 1a and to fix the drink rack 2 in the car.

Figure 7:
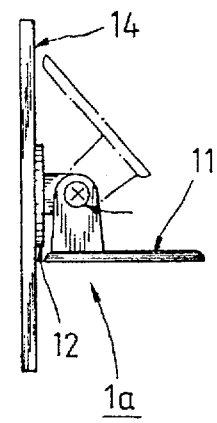
FIG. 7 is a right side view of angular scope for adjusting the mounting of a locking plate of a first mounting frame for articles rack in the car.

If the position for mounting a drink rack 2 in the car is a very small area in a "horizontal" state, the bolt 15 on the first mounting frame 1a can be slightly turned loose so as to push down the locking plate 11 to be adjusted in a "horizontal" state as shown in FIG. 7 and then tightly locked for locking the locking plate 11 in the "horizontal" manner as shown by the solid line in FIG. 7 and mounting a drink rack 2 in the car as shown in FIG. 5.

Figure 10:
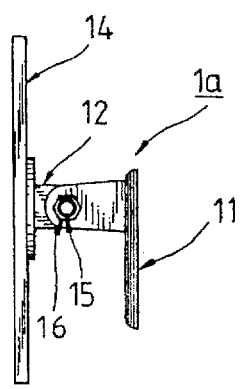
FIG. 10 is a right side view of another angular scope for adjusting the mounting of a locking plate of a first mounting frame for articles rack in the car.

If the position for mounting a drink rack 2 in the car is too low as shown in FIG. 10, to turn loose the locking screw slightly between a mounting plate 14 and a first connecting element 12 of the first mounting frame 1a, and then to turn the first connecting element 12 and a locking plate 11 on the first connecting element 12 clockwise and counterclockwise for 180° in respect of the locking screw, so as to let the plate body 110 of locking plate 11 be in a downward "vertical" state as shown in FIG. 10 and locked in a position for mounting a drink rack 2 in the car.

If the position for mounting a drink rack 2 in the car is not in a "vertical" or "horizontal" state, to turn the locking bolt 15 slightly between the locking plate 11 and the first connecting element 12, then to push the locking plate 11 together with the first connecting element 12 upward from the position as shown by the solid line in FIG. 7 to a position in a certain angle as shown by the imaginary line, to tightly lock the said bolt 15, and the drink rack 2 can be conveniently installed in a position of the locking plate 11 even such a position is a very small plane and inclined "forward" or "rearward".

Figure 8:
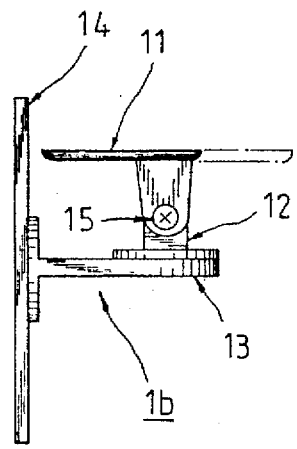
FIG. 8 is a right side view of angular scope for adjusting the mounting of a locking plate of a second mounting frame for articles rack in the car.
Figure 9:
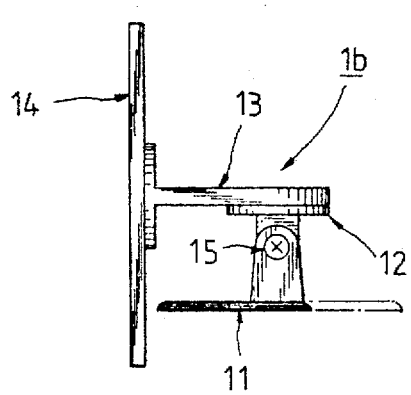
FIG. 9 is a right side view of another angular scope for adjusting the mounting of a locking plate of a second mounting frame for articles rack in the car.

From FIGS. 1 and 2 in contrast with each other, obviously we can tell the difference between the first and second mounting frames 1a, 1b for articles rack in the car: fixing a second connecting element 13 between the first connecting element 12 and the mounting plate 14 of the first mounting frame 1a becomes the second mounting frame 1b. Therefore, so far as the installation, adjustment and use are concerned, the characteristics of a first connecting element 12 and a locking plate 11 of the second mounting frame 1b in the first half phase are the same as those of the first mounting frame 1a, so some one rack such as the drink rack 2 in the car can also be installed on the mounting plate 14 which can be mounted in a very small "vertical" position as shown in FIG. 6 and also can be optionally mounted in a "horizontal" or "forward" or "rearward" inclined manner. Particularly, the second connecting element 13 of the second mounting frame 1b can be turned clockwise and counterclockwise for an angle from 0° to 360° in respect of the screw on the mounting plate 14, and the first connecting element 12 together with the locking plate 11 on the said element 12 also can be turned clockwise and counterclockwise for an angle from 0° to 360° in respect of a locking screw 17 between the first connecting element 12 and the second connecting element 13 as shown in FIG. 2, so the mounting plate 14 can be optionally mounted in a "horizontal" plane on the top in the car in a state of suspension or in a "horizontal" plane nearby the instrument board in the car in a horizontal state as shown in FIGS. 8 and 9.

In addition, after the foregoing any one installation is finished, if some rack such as the drink rack 2 in the car fixed on the mounting plate 14 of the second mounting frame 1b is found defective, the fixing bolt 15 between the locking plate 11 and the first connecting element 12 can be turned loose to adjust the forward or rearward inclined angle of said rack 2 in a range between 0° and 180°, the locking screw between the first connecting element 12 and the second connecting element 13 can be turned loose to adjust an angle left and right ranging from 0° to 360°, and the locking screw between the second connecting element 13 and the mounting plate 14 can be turned loose to adjust the mounting plate 14 together with the said rack 2 mounted thereon for an angle left and right ranging from 0° to 360°. Therefore, any desirable angle can be adjusted before and after installation and it is very convenient to mount, take and use the articles on the rack 2, and it is not necessary to consider or limit the angle of mounting position.

Figure 11:
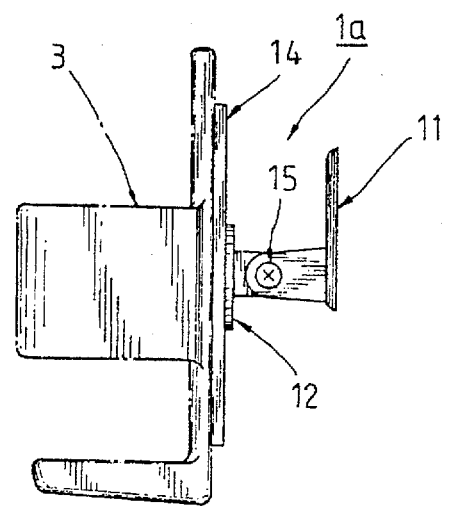
FIG. 11 is a right side view of an example of a first mounting frame for articles rack in the car to lock and install a mobile telephone set disposing rack.

The foregoing first or second mounting frame 1a, 1b for articles rack in the car, except being used to mount the drink rack 2 in the car, can be used to mount a mobile telephone set through mounting a mobile telephone set rack 3 on the mounting plate 14 as shown in FIG. 11; similarly, it can be used to mount a rack for indoor aromatic agent, air cleaner, tissue paper box, sound-recording tape box, etc. of which the installation and use are same convenient and practical.

Figure 3:
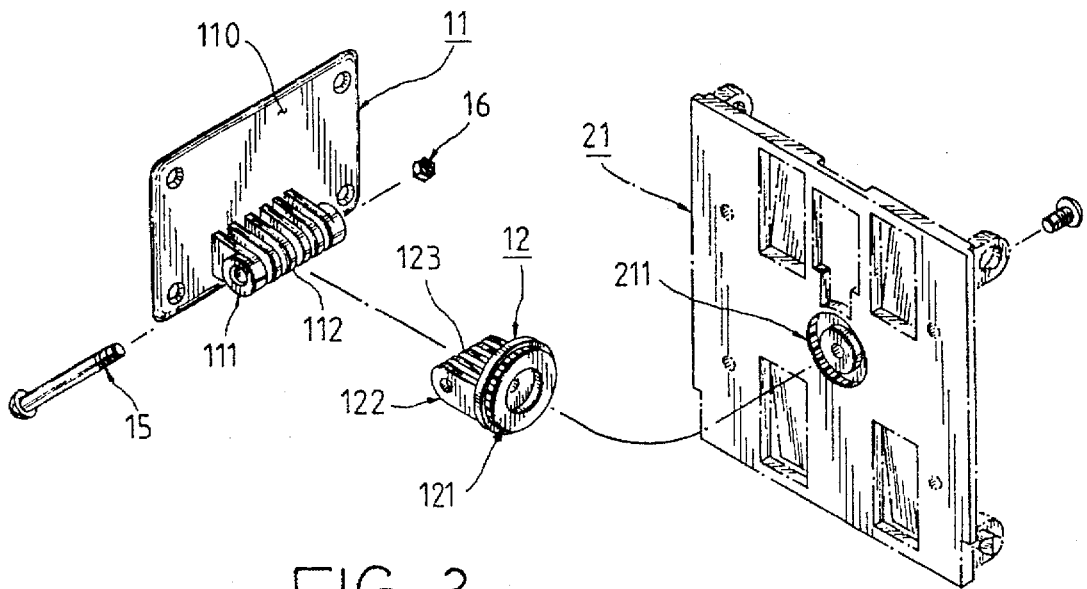
FIG. 3 is an elevational breakdown view of a first mounting frame for articles rack in the car without a mounting plate to be directly locked and installed on the back of a fixing plate of a drink rack in the car, wherein the whole drink rack in the car is not shown for convenient disclosure.
Figure 4:
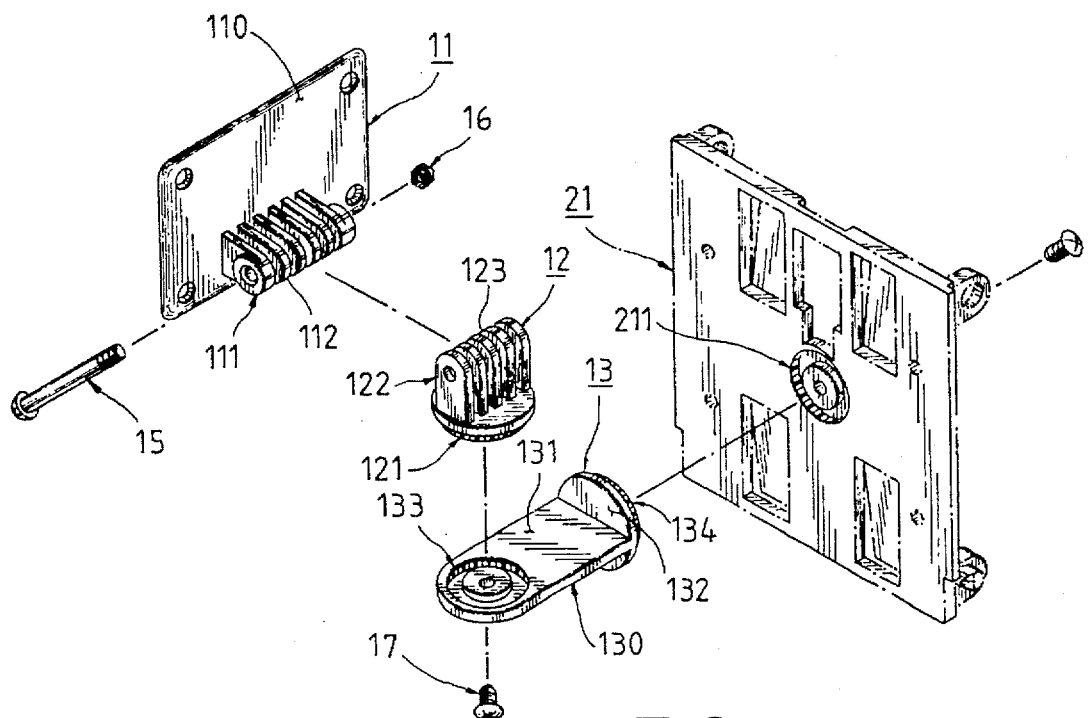
FIG. 4 is an elevational breakdown view of a second mounting frame for articles rack in the car without a mounting plate to be directly locked and installed on the back of a fixing plate of a drink rack in the car, wherein the whole drink rack in the car is not shown for convenient disclosure.
Figure 12:
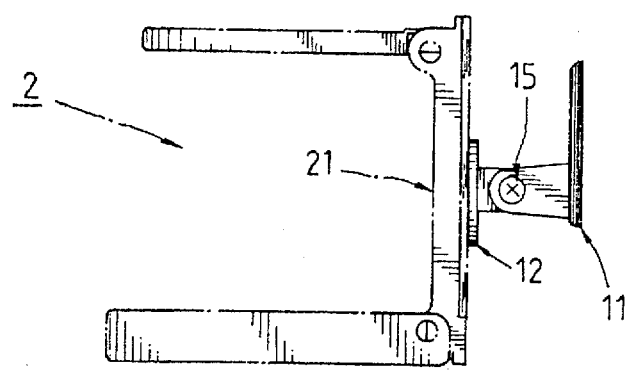
FIG. 12 is a right side view of an example of a first mounting frame for articles rack in the car directly locked and installed on the back of a fixing plate of a drink rack in the car.
Figure 13:
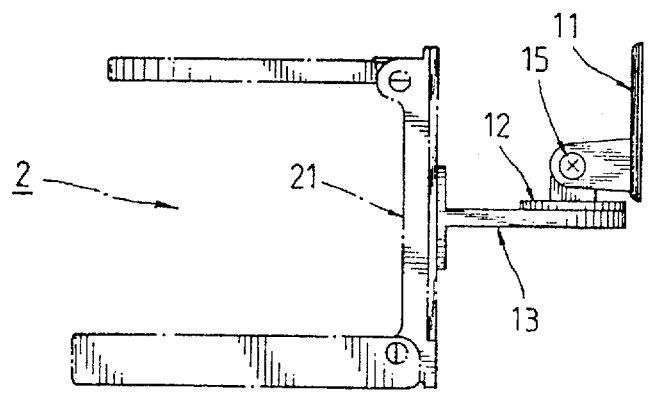
FIG. 13. is a right side view of an example of a second mounting frame for articles rack in the car directly locked and installed on the back of a fixing plate of a drink rack in the car.

As shown in FIGS. 12 and 13, the first and second mounting frame 1a, 1b according to the present invention may also not be provided with a mounting plate 14, but the first connecting element 12 or the second connecting element 13 can be directly locked on the back of the fixing plate 21 of drink rack 2 for mounting the said rack 2 or other articles rack. However, as shown in FIGS. 3 and 4, it is necessary to provide an internal gear 211 at the center on the back of the fixing plate of drink rack 2, to let the gear 121 on the first connecting element of the first mounting frame 1a or the gear 134 on the second connecting element 13 engage with the internal gear 211 of the fixing plate 21, and to lock same with a screw (same as screw 17), so it is further convenient and optional to mount the said drink rack 2 in a very small plane position in the car in any angle through the locking plate 11 of the first or second mounting frame 1a, 1b for disposing and using the canned drink or a cup with tea or drink.

Similarly, an internal gear also can be directly provided on the back of the mobile telephone set rack 3 or other rack in the car or a fixing plate thereof, and then to lock the first connecting element 12 of the first mounting frame 1a or the second connecting element 13 of the second mounting frame 1b, the said rack 3 can be further conveniently and optionally mounted in a very small plane position in the car in any angle, and after it is mounted well, the disposing angle of mounted rack can also be conveniently and optionally adjusted in favor of taking and using same.

I claim:

1. A mounting frame for an article rack in a car, said mounting frame comprising:

a locking plate including a plate body and a hinge shaft sleeve on one side of the plate body, a first connecting element including a gear at one end thereof and a hinge shaft sleeve on the back of the gear, and the first connecting element and the locking plate being pivotally connected to each other through the hinge shaft sleeve on the first connecting element and the hinge shaft sleeve on the locking plate, a second connecting element including a lateral T-shaped plate body having an internal gear at one end of the T-shaped plate body and a gear at an outer end of the T-shaped plate body, and the first and second connecting elements being pivotally connected to each other through the internal gear on the second connecting element and the gear on the first connecting element, a mounting plate for supporting an article to be mounted in the car, a length and a width of said locking plate being less than a length and a width of said mounting plate for mounting the article in the car in a confined mounting space, and a first mounting frame for mounting articles in the car including the locking plate, the first connecting element and the mounting plate pivotally connected together, and a second mounting frame for mounting articles in the car including the locking plate, the first connecting element, the second connecting element and the mounting plate pivotally connected together.

2. The mounting frame for the article rack in the car as claimed in claim 1, wherein the gear on the first connecting element of the first mounting frame is directly pivotally connected to one of the article rack and a fixing plate for supporting the article to be mounted in the car.

3. The mounting frame for the article rack in the car as claimed in claim 2, further comprising an internal gear on one of the article rack and the fixing plate to engage with and pivotally connect to the gear on the first connecting element of the first mounting frame or the gear on the second connecting element of the second mounting frame.

4. The mounting frame for the article rack in the car as claimed in claim 1, wherein the gear on the second connecting element of the second mounting frame is directly pivotally connected to one of the article rack and the fixing plate for supporting the article to be mounted in the car.

5. The mounting frame for the article rack in the car as claimed in claim 1, wherein the hinge shaft sleeve on the locking plate of the first and second mounting frames and the hinge shaft sleeve on the first connecting element comprise a plurality of sheet plates connected in parallel to each other and having a through bore for receiving a bolt so that they can be mutually, tightly and firmly locked and fixed to each other without loosening when the two hinge shaft sleeves are mutually secured to each other.

* * * * *